United States Patent [19]

Heuschen et al.

[11] Patent Number: 5,959,065
[45] Date of Patent: Sep. 28, 1999

[54] COMPOSITION AND ARTICLE

[75] Inventors: Jean Marie-Hubert Heuschen, Evansville; John Benjamin Luce; Stephan Zeb Tomlinson, both of Mt. Vernon, all of Ind.

[73] Assignee: General Electric Co., Schenectady, N.Y.

[21] Appl. No.: 07/228,710

[22] Filed: Aug. 5, 1988

[51] Int. Cl.⁶ ..................................................... C08G 64/00
[52] U.S. Cl. .............................................................. 528/198
[58] Field of Search ............................................... 528/198

[56] References Cited

U.S. PATENT DOCUMENTS 4,774,315   9/1988   Miller ...................................... 528/198

FOREIGN PATENT DOCUMENTS 20993   2/1976   Japan .

OTHER PUBLICATIONS

Hay, U.S.P. 3,306,875, Cols. 1–2, 35–36, (2.67).

Primary Examiner—Morton Foelak

[57] ABSTRACT

A paracumylphenol endcapped polycarbonate resin having a Kasha Index of from about 2800 to about 3400 centiseconds.

7 Claims, No Drawings

COMPOSITION AND ARTICLE

BACKGROUND OF THE INVENTION

Compact discs have been a unique article of commerce for the last few years. This new information storage device utilizes a laser beam for reading the information stored therein by the reflection of the laser off a metallic layer through a material which has molded in data bits in the form of pits and lands. The data bit pattern alters the intensity of the reflected laser to produce digital information. Materials used in the compact discs have been various plastics such as polymethylmethacrylate and polycarbonate. Polycarbonates employed in this application are described in U.S. Pat. No. 4,514,357 wherein a very low molecular weight bisphenol-A polycarbonate, the average molecular weight from about 12,000 to 18,000, is employed as the plastic material message carrier. Accurate pit reflection and minimum birefringence in the compact disc requires the use of a plastic material which has great flowability, or in other words, a very low melt viscosity. Dimensional stability and ductility are also important product attributes. Also desirable is excellent processability of the material as manifested by minimum cycle time.

Various polycarbonates have been utilized in the compact disc area. A recently issued U.S. Pat. No. 4,734,488, discloses a polycarbonate which must have an aryl or aralkyl group attached to the carbon atom separating the two phenols and a low molecular weight. The aforementioned U.S. Pat. No. 4,514,357 provides further examples of such materials, specifically bisphenol-A polycarbonate. The example of the end group used in the aforementioned '357 patent is a paratertiary butyl phenol.

It has now been found that paracumylphenol endcapped polycarbonate with a certain melt viscosity range as measured by Kasha Index, provides significant advantages over the prior used compact disc materials. Advantages include improved ductility as measured by ⅛ inch Notched Izod impact and decreased cycle time.

SUMMARY OF THE INVENTION

In accordance with the invention there is a paracumylphenol endcapped polycarbonate having a melt viscosity range of from about 2800 to about 3400 centiseconds as measured by Kasha Index. It is preferable to use a bisphenol-A polycarbonate. It is also preferable to have a Kashi Index from about 2900 to about 3100.

A further aspect of the invention is an article having excellent characteristics molded from the polycarbonate described above such as lenses laser read information carriers and the like. It is preferred that the article be in a disc shape and have a diameter of from about 70 to about 300 mm. It is most preferred that the article be a compact disc, the dimensions being a diameter of 120 mm and a thickness of 1.2 mm.

DETAILED DESCRIPTION OF THE INVENTION

The polycarbonates useful in the application of this invention are the usual polycarbonates which have been known for at least 30 years. They are prepared by standard methods and utilize the typical dihydric phenols employed in the synthesis of polycarbonates. These polycarbonates as well as methods of their preparation are described inter alia in U.S. Pat. Nos. 3,161,615; 3,220,973; 3,312,659; 3,312,660; 3,313,777; 3,666,614 and 3,393,672, all of which are incorporated herein by reference. The polycarbonates may be prepared by a variety of known methods, including the interfacial polymerization process which involves a coreaction of at least one dihydric phenol with a carbonate precursor. The polycarbonate resins contain at least one recurring or repeating structural unit represented by the formula

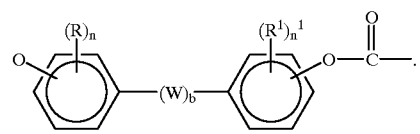

I wherein:

R and $R^1$ are independently selected from monovalent hydrocarbon radicals, monovalent hydrocarbonoxy radicals, and halogen radicals;

W is selected from divalent hydrocarbon radicals,

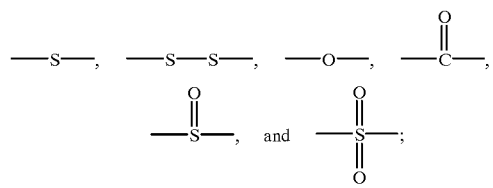

n and $n^1$ are independently selected from integers having a value of from 0 to 4 inclusive;

and b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from about 4 to about 8 ring carbon atoms. The preferred aryl radicals are those containing from 6 to 12 ring carbons, i.e., phenyl, biphenyl, and naphthyl. The preferred aralkyl and alkaryl radicals are those containing from 7 to about 14 carbon atoms.

The preferred halogen radicals represented by R and $R^1$ are chlorine and bromine.

The monovalent hydrocarbonoxy radicals represented by R and $R^1$ may be represented by the formula —$OR^2$ wherein $R^2$ is a monovalent hydrocarbon radical of the type described hereinafore. Preferred hydrocarbonoxy radicals are the alkoxy and aryloxy radicals.

The divalent hydrocarbon radicals represented by W include the alkylene, alkylidene, cycloalkylene, and cycloalkylidene radicals. The preferred alkylene radicals are those containing from 2 to about 20 carbons. The preferred alkylidene radicals are those containing from 1 to about 20 carbons. The preferred cycloaklylene and cycloalkylidene radicals are those containing from 6 to about 16 ring carbon atoms. The letter b is preferably 1 and n and $n^1$ are each preferably zero.

Typically, the dihydric phenols utilized in the preparation of the polycarbonate resins may be represented by the general formula

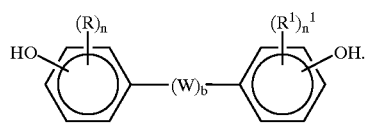

wherein R, R¹, n, n¹, W and b are as defined hereinafore.

Some illustrative non-limiting examples of dihydric phenols falling within the scope of Formula II include:

2,2-bis(4-hydroxyphenyl)propane (bisphenol-A);
2,2-bis(3,5-dibromo-4-hydroxyphenyl)propane;
2,2-bis(3,5-dimethyl-4-hydroxyphenyl)propane;
2,2-bis(3-bromo-5-methyl-4-hydroxyphenyl)propane;
1,1-bis(4-hydroxyphenyl)cyclohexane;
1,1-bis(4-hydroxyphenyl)cyclododecane;
1,1-bis(3,5-dimethyl-4-hydroxyphenyl)cyclododecane;
1,1-bis(4-hydroxyphenyl)decane;
1,4-bis(4-hydroxyphenyl)butane;
bis(4-hydroxyphenyl)methane;
4,4'-thiodiphenol; and
bis(4-hydroxyphenyl)ether.

Other dihydric phenols which are useful are described in U.S. Pat. Nos. 2,998,835; 3,028,365 and 3,334,154, all of which are incorporated herein by reference.

The preferred dihydric phenol is bisphenol-A.

The carbonate precursor may be a carbonyl halide, a carbonate ester, or a bishaloformate. The carbonyl halides may be carbonyl bromide, carbonyl chloride, or mixtures thereof. The carbonate esters may be diphenyl carbonate; di(halophenyl)carbonate such as di(bromophenyl)carbonate, di(chlorophenyl)carbonate, and di(tribromophenyl) carbonate; di(alkylphenyl)carbonates such as di(tolyl) carbonate; di(naphthyl)carbonate; chlorophenyl chloronaphthyl carbonate; and phenyl tolyl carbonate. The bishaloformates that can be used include the bishaloformates of dihydric phenols such as the bischloroformates of bisphenol-A and hydroquinone; and the bis-haloformates of glycols such as the bischloroformates of ethylene glycol, neopentyl glycol, and polyethylene glycol. The preferred carbonate precursor is carbonyl chloride, also known as phosgene.

The molecular weight of the polycarbonate resin is controlled by a monofunctional phenol which terminates the ends of the resin. The specific phenol used in this to prepare the polycarbonate of the invention is paracumyl phenol. This particular phenol is disclosed for endcapping polycarbonate resins, see JP 57-133149. However, there is generally no specific molecular weight range or viscosity identified.

Kasha Index is a measurement of melt viscosity of the resin. The procedure for determining the Kasha Index is as follows: 7 grams of resin pellets, dried a minimum of 90 minutes at 125° C. are added to a modified Tinius-Olsen model T3 melt indexer; the temperature in the indexer is maintained at 250° C. and the resin is heated at this temperature for 6 minutes; after 6 minutes the resin is forced through a 1.05 mm radius orifice using a plunger of radius 4.7 mm and an applied force of 7.7 kgs. The time required for the plunger to travel 5.1 cm is measured in centiseconds; this is reported as the KI. The higher the KI, the higher the melt viscosity and the more viscous the resin, and the harder or more difficult the processability.

The paracumyl phenol can be the sole endcapping unit on the polycarbonate resin or there can be a mixture of endcapping reagents used in the synthesis of the resin to obtain the endcapped resin. For example phenol or paratertiarybutyl phenol may also be employed together with the paracumyl phenol. However, there should be sufficient paracumyl phenol to bring about the physical properties desired in the resin to be utilized in the intended application. At least about 50 mole percent of the endcapping unit should be paracumyl phenol, preferably above about 70 percent. The general method of preparing the resin would be to utilize the paracumyl phenol as the sole endcapping reagent for the polycarbonate resin.

The paracumyl phenol endcapped polycarbonate resin is then extruded and injection molded into an article having excellent optical characteristics such as a compact disc. The extrusion temperature is generally from about 275° to about 310° C. and the molding temperature is from about 315° to about 360° C.

Below are examples of the invention. They are intended to illustrate the scope of the invention rather than limit the inventive scope.

EXAMPLE 1

COMPARATIVE TESTING OF EXAMPLE OF INVENTION AGAINST PRIOR ART a. A paracumylphenol (PCP) endcapped bisphenol-A polycarbonate prepared by standard interfacial methods utilizing approximately 5.8 mole % paracumylphenol. One sample with a KI of 2955 was tested against several paratertiarybutylphenol (PTBP) endcapped polycarbonate commercial samples of equivalent KI using a ⅛ inch notched Izod impact resistance test ASTM D260. The Notched Izod bars were aged for 2 hours before testing at a certain temperature. The data for each temperature is presented in ft-lbs/in.

| END CAP | KICSEC | 0° C. | 20° C. | 40° C. | 60° C. |
| --- | --- | --- | --- | --- | --- |
| PTBP[a] | 3060 | 0.28 | 4.14 | 4.43 | 9.29 |
| PTBP[b] | 3060 | 0.30 | 2.02 | 4.51 | 11.24 |
| PCP | 2955 | 3.66 | 6.14 | 8.65 | 9.25 |

[a]GE ML5468
[b]Teijin

The PCP endcapped polycarbonate substantially outperformmed the PTBP endcapped polycarbonate at all temperatures except the highly elevated temperature of 60° C.

b. A PCP endcapped bisphenol-A polycarbonate having a KI of 2980 was tested against PTBP endcapped bisphenol-A polycarbonate with an equivalent KI for differences in processing time. The tests were run on different days using the same or different lots of resin on a Krauss Maffei KM-60B compact disc molding machine with the cycle time controlled so as to provide the minimum time attainable to maintain a steady state operation without discs sticking to the stamper and disrupting the process.

The Krauss Maffei was run under the following conditions for the first two comparative test runs.

1. Barrel heats (° F.)
   Rear—Front Nozzle
   500 570 615 615 615 615
2. Melt temperature—630° F.
3. Tool temperature—(° F.)
   Fixed side 120
   Movable side 140
4. Programmed profile injection speed slow to fast.

5. Programmed profile injection pressure 10 steps 1200 to 480 psi
6. Screw speed 65% maximum
7. Back pressure 150 psi
8. Screw recovery range 1.8–2.1 seconds Below are the results of 3 separate determinations of cycle time.

| END CAP | MINIMUM CYCLE (SECONDS) |
|---------|-------------------------|
| PTBP    | 8.4                     |
| PCP     | 6.8                     |
| PTBP    | 8.0                     |
| PCP     | 6.9                     |
| PTBP    | 7.8                     |
| PCP     | 6.8                     |

As shown by the data, PCP has a clear and significant advantage in cycle time. In a given time period, far more compact discs can be prepared using a PCP endcapped polycarbonate than a PTBP endcapped polycarbonate.

As seen from the above data, the paracumylphenol endcapped polycarbonate resin has distinct advantages over the resin known in the art in the preparation of compact discs.

We claim:

1. A paracumylphenol endcapped polycarbonate resin having a Kasha Index of from about 2800 to about 3400 centiseconds at 250° C.

2. The polycarbonate of claim 1 wherein at least 50 mole percent of the endcapping units are paracumylphenol.

3. The polycarbonate of claim 2 wherein at least 70 mole percent of the endcapping units are paracumylphenol.

4. The polycarbonate of claim 1 which is a bisphenol-A polycarbonate.

5. A disc having excellent optical characteristics prepared from the polycarbonate of claim 1.

6. A paracumylphenol endcapped polycarbonate resin for forming an article for use in an optical application, having a Kasha Index of from about 2800 to about 3400 centiseconds at 250° C.

7. An article for use in an optical application formed of a paracumylphenol endcapped polycarbonate resin having a Kasha Index of from about 2800 to about 3400 centiseconds at 250° C.

* * * * *